W. SHERWOOD.
PIPE COVERING.
APPLICATION FILED JUNE 23, 1909.
951,342.
Patented Mar. 8, 1910.
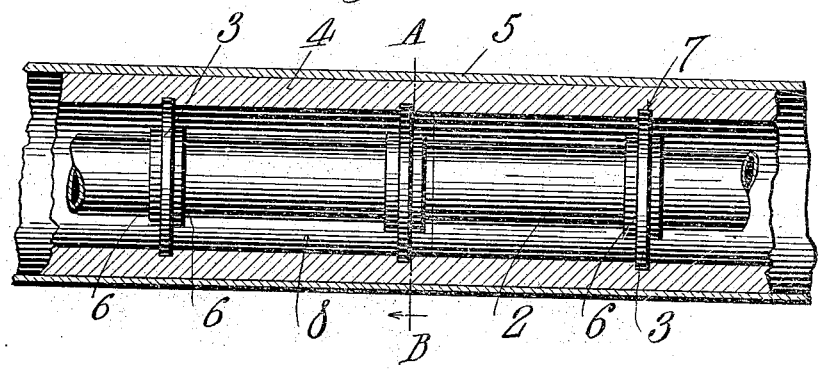
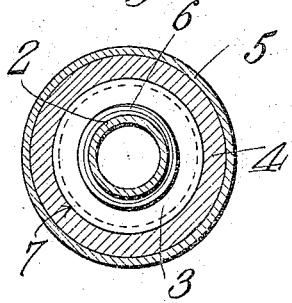
Walter Sherwood
Inventor

UNITED STATES PATENT OFFICE.

WALTER SHERWOOD, OF NORTH YAKIMA, WASHINGTON, ASSIGNOR OF ONE-HALF TO JOHN SAWBRIDGE, OF NORTH YAKIMA, WASHINGTON.

PIPE-COVERING.

951,342.  Specification of Letters Patent.  Patented Mar. 8, 1910.

Application filed June 23, 1909. Serial No. 503,943.

*To all whom it may concern:*

Be it known that I, WALTER SHERWOOD, a citizen of the United States, residing at North Yakima, in the county of Yakima and State of Washington, have invented a new and useful Pipe-Covering, of which the following is a specification.

It is the object of this invention to provide a tubular, integral, air spaced covering, adapted to be assembled with steam, hot water, hot air, brine, and ammonia pipes, and with pipes designed to be used under ground and moist places; whereby the contents of the pipes may be maintained at an even temperature, and the pipes themselves and their contents be protected against deterioration through the action of external agencies; other and further objects being made manifest hereinafter as the description of the invention progresses.

In the accompanying drawings one embodiment of the invention is shown, but it is to be understood that, within the scope of what hereinafter is claimed, divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings:—Figure 1 shows my invention in longitudinal section; and Fig. 2 is a transverse section on the line A—B of Fig. 1.

The invention comprises an inner tube 2, designed to receive the pipe. Mounted upon the inner tube 2 are spacing rings 3, carrying a packing tube 4, which is surrounded by an outer covering 5. There may be any number of the spacing rings 3, and they may be mounted at various distances apart upon the inner tube 2, the particular manner in which the spacing rings 3 are disposed, being dictated by the exigencies of the proposed use. The inner tube 2, the spacing rings 3, and the packing tube 4, are preferably fashioned from a refractory, heat-insulating medium. The outer covering 5 may be fashioned from this same material, or, if the device is to be used in a moist place, the outer covering 5 may be fashioned from water-proof material. The packing tube 4 constitutes the principal insulating member of the device, and, compared with the inner tube 2 and the outer covering 5, is relatively thick.

If desired, auxiliary rings 6 may be disposed upon either side of each of the spacing rings 3, to retain the said spacing rings in place and to prevent their movement longitudinally of the inner tube 2. In order further to limit the movement of the spacing rings, the inner face of the packing tube 4 may be circumferentially recessed, as denoted by the numeral 7, to receive the periphery of the spacing rings 3. The auxiliary rings 6, when employed, may be fashioned in any manner. If desired, they may consist of strips of asbestos mill-board, wrapped about the inner tube 2, upon either side of each of the auxiliary rings 6. The spacing rings 3 serve to separate the packing tube 4 from the inner tube 2, forming in the interior of the device, a plurality of dead air spaces 8.

The engagement between the spacing rings 3 and the seats or recesses 7 of the packing tube 4 serves greatly to increase the strength and rigidity of the device, it being obvious, that, owing to the relatively small width of the spacing rings, a mere frictional engagement between the peripheries of the spacing rings and the inner surface of the packing tube 4 would, under many circumstances, be inefficient to maintain the rigid relation between the parts, it being recalled that in setting up and tearing down pipe structures, the pipes are subjected to strains and shocks, the severity of which is determined solely by the intelligence and care of the operator.

Having thus described the invention, what is claimed is:—

A cylindrical, imperforate pipe covering comprising an inner tube within which the pipe to be covered is adapted to be telescoped, a packing tube surrounding the inner tube and spaced therefrom, rings uniting the inner tube with the packing tube and of less thickness longitudinally of the covering, than the transverse thickness of the packing tube, there being annular seats in the interior of the packing tube to receive the rings; and auxiliary rings inclosing the inner tube closely and in close contact with each of the other rings upon both sides thereof to constitute reinforcing elements for the last named rings when the pipe is telescoped within the inner tube.

In testimony that I claim the foregoing as my own, I have hereto affixed my signature in the presence of two witnesses.

WALTER SHERWOOD.

Witnesses:
H. B. DOUST,
CORAL E. DOUST.